United States Patent
Arai et al.

(10) Patent No.: US 11,063,873 B2
(45) Date of Patent: Jul. 13, 2021

(54) DATA COLLECTION SERVER AND DATA COLLECTION METHOD

(71) Applicant: Hitachi, Ltd., Tokyo (JP)

(72) Inventors: Takamasa Arai, Tokyo (JP); Tsutomu Konno, Tokyo (JP); Shinichiro Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 34 days.

(21) Appl. No.: 16/568,393

(22) Filed: Sep. 12, 2019

(65) Prior Publication Data
US 2020/0314018 A1 Oct. 1, 2020

(30) Foreign Application Priority Data
Mar. 29, 2019 (JP) .............................. JP2019-065397

(51) Int. Cl.
| | |
|---|---|
| G06F 15/16 | (2006.01) |
| H04L 12/815 | (2013.01) |
| G06F 11/30 | (2006.01) |
| G06F 16/25 | (2019.01) |

(52) U.S. Cl.
CPC .......... *H04L 47/22* (2013.01); *G06F 11/3006* (2013.01); *G06F 16/258* (2019.01)

(58) Field of Classification Search
None
See application file for complete search history.

(56) References Cited

U.S. PATENT DOCUMENTS

| | | | | |
|---|---|---|---|---|
| 6,181,711 B1* | 1/2001 | Zhang | .................. | H04M 11/062 370/468 |
| 2011/0238858 A1* | 9/2011 | Sagara | ..................... | H04L 47/34 709/232 |
| 2012/0170467 A1* | 7/2012 | Bencheck | ........... | H04L 41/5025 370/252 |
| 2015/0249604 A1* | 9/2015 | Folsom | ................... | H04L 49/25 370/392 |
| 2015/0249620 A1* | 9/2015 | Folsom | ................... | H04L 45/74 370/392 |
| 2016/0232983 A1* | 8/2016 | Khurana | ............... | G11C 7/1006 |
| 2017/0072637 A1* | 3/2017 | Yanazume | ............ | B29C 64/393 |
| 2018/0113972 A1* | 4/2018 | Suresh | .................... | G06F 30/30 |
| 2019/0266170 A1* | 8/2019 | Hazel | ................... | G06F 16/221 |

FOREIGN PATENT DOCUMENTS

JP 2018-181262 A 11/2018

* cited by examiner

*Primary Examiner* — Brandon M Renner
(74) *Attorney, Agent, or Firm* — Mattingly & Malur, PC

(57) ABSTRACT

A data collection server that collects and converts data has a data processor that executes shaping processes to shape collected data, sets a data processing flow based on the shaping processes, sets information of an execution environment of the shaping processes and converts the processing flow based on the information of the execution environment. The processor accepts setting inputs of first and second flags before and after the plurality of shaping processes and performs an integrated shaping process for collectively executing the plurality of shaping processes between the first and second flags when set. The processor also updates information of the execution environment based on execution contents of the integrated shaping process.

6 Claims, 7 Drawing Sheets

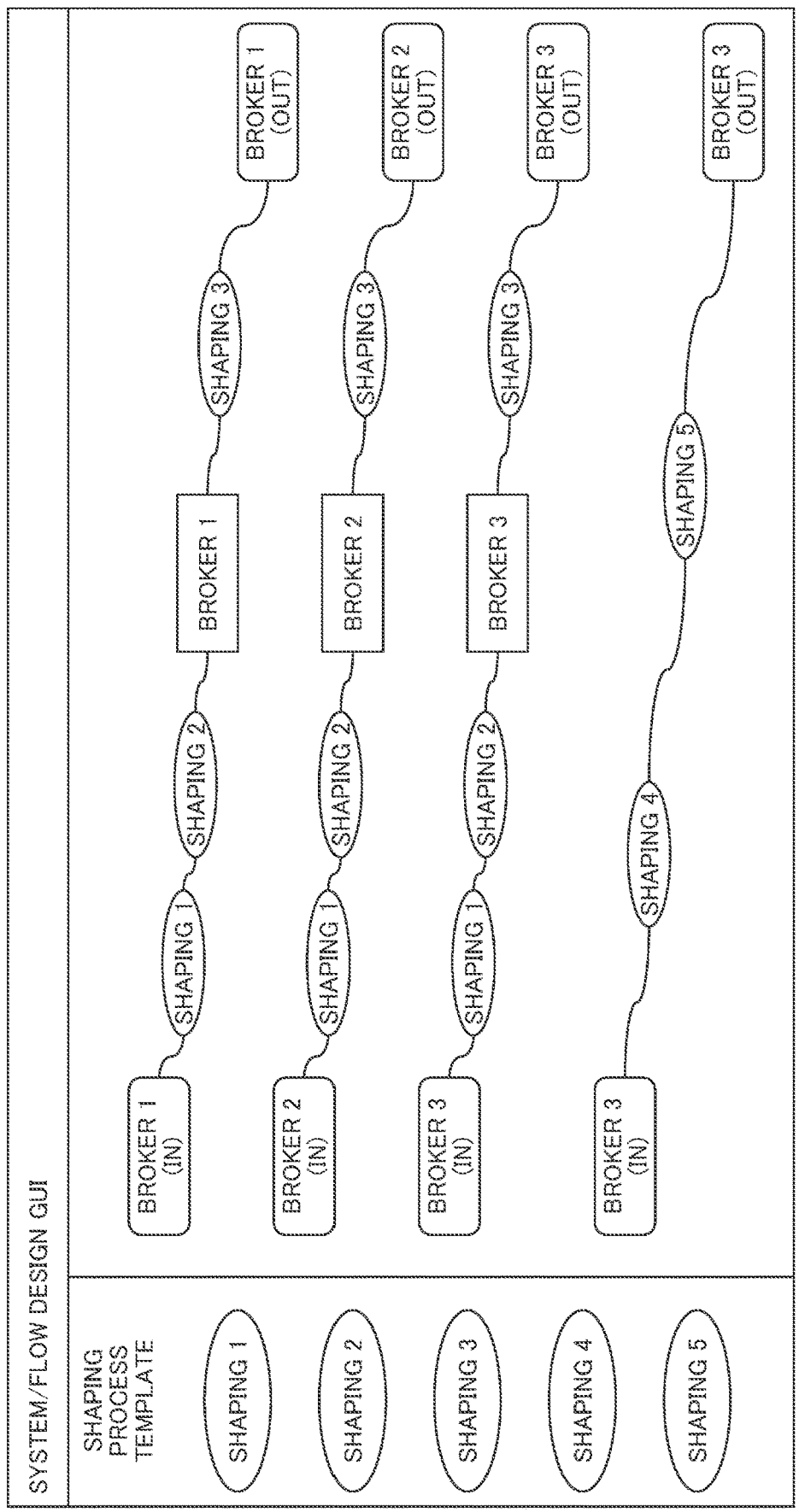
F I G. 5

DATA COLLECTION SERVER AND DATA COLLECTION METHOD

CROSS-REFERENCE TO RELATED APPLICATION

The present application claims priority from Japanese application JP 2019-065397, filed on Mar. 29, 2019, the contents of which is hereby incorporated by reference into this application.

BACKGROUND OF THE INVENTION

1. Field of the Invention

The present invention relates to a data collection server and a data collection method.

2. Description of the Related Art

JP 2018-181262 A discloses that in a flow conversion system, "a plurality of devices arranged at a site, such as a factory, a flow conversion server, and a data processing server are connected to a network, the data processing server includes a data processing server has a data processing unit for conducting shaping process of shaping site data collected from a plurality of devices, and the flow conversion server includes: a flow designing unit for creating a processing flow of the site data on the basis of the shaping process in the data processing unit; an execution environments information storage unit for storing information of execution environments; a flow conversion unit for converting the processing flow created by the flow designing unit based on the information of the execution environments stored in the execution environments information storage unit; and a system definition unit for creating and distributing an execution program based on the processing flow converted by the flow conversion unit."

With the development of Internet of things (IOT), in order to utilize site data for applications in various industries, it is necessary to quickly develop various data collection and shaping processes. However, requirements of processing contents differ depending on an execution environment such as a server configuration, data, and definition of data to be output. Based on the execution environment and requirements as described above, it is not easy for a site SE to quickly design data collection and shaping process. For example, there is JP 2018-181262 A which discloses a technique for providing a user with a simple and quick design means corresponding to the execution environment by converting and displaying a processing flow of the side data according to the execution environment and requirements.

However, JP 2018-181262 A does not mention means for a user to set an execution unit of the shaping process.

SUMMARY OF THE INVENTION

A typical example of the invention disclosed in the present application is as follows. That is, a data collection server is used that collects and converts data, the data collection server including: a data processing unit that executes one or a plurality of shaping processes to shape collected data; a flow setting unit that sets a data processing flow based on the shaping processes in the data processing unit; an execution information setting unit that sets information of an execution environment of the shaping processes; and a flow conversion unit that converts the processing flow created by the flow setting unit based on the information of the execution environment set by the execution information setting unit, in which the flow setting unit accepts setting inputs of first and second flags before and after the plurality of shaping processes, in which the data processing unit performs an integrated shaping process for collectively executing the plurality of shaping processes between first and second flags when there are the first and second flags before and after the plurality of shaping processes, and in which the execution information setting unit updates information of the execution environment based on execution contents of the integrated shaping process.

According to the present invention, a user can easily and quickly set and execute a data shaping process unit according to an execution environment such as a server configuration.

BRIEF DESCRIPTION OF THE DRAWINGS

FIG. 5 is a diagram illustrating a processing flow after converting a data shaping processing flow;

DETAILED DESCRIPTION OF THE PREFERRED EMBODIMENTS

Hereinafter, embodiments of the present invention will be described in detail with reference to the drawings.

Figure 1:
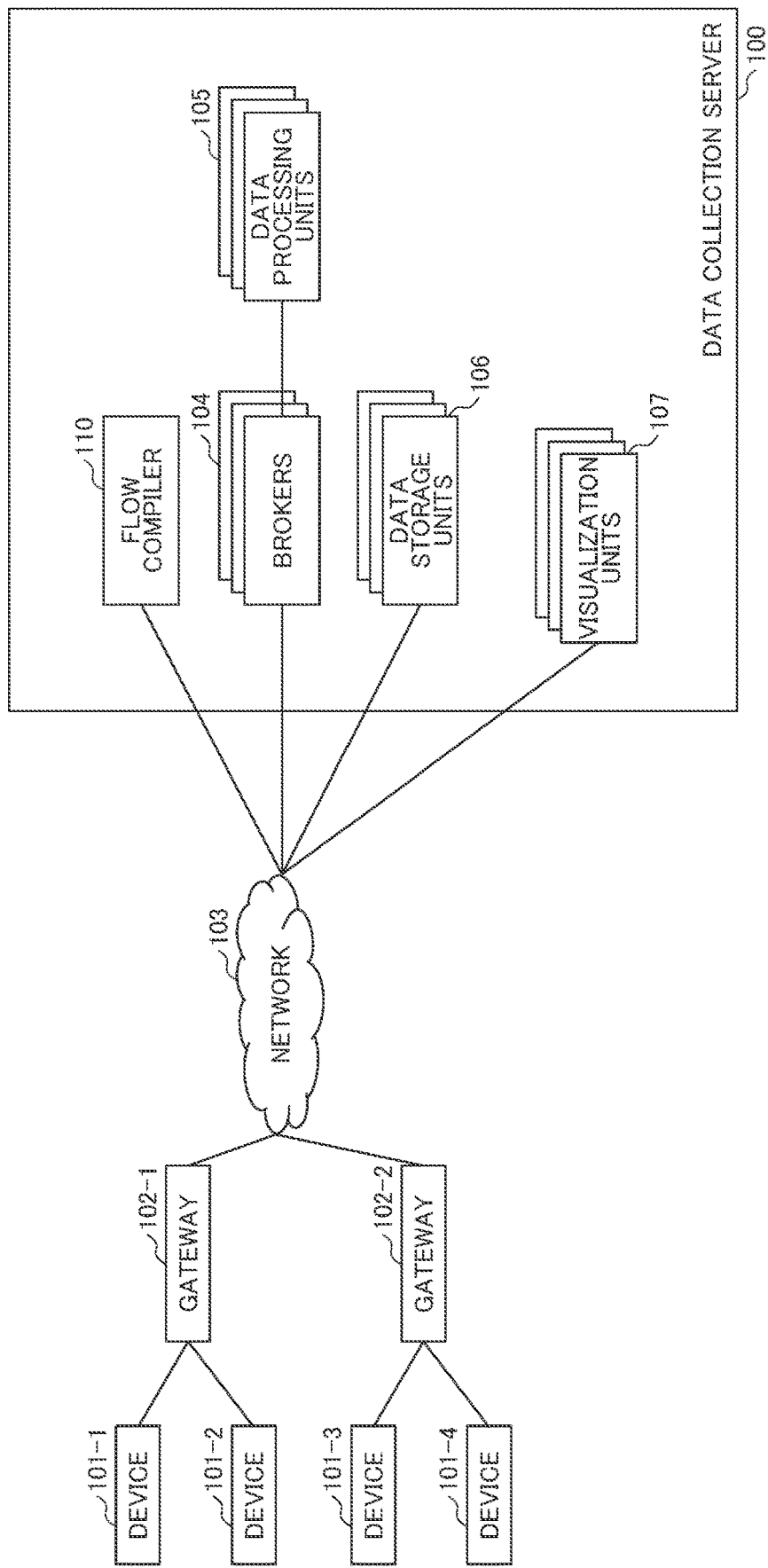
FIG. 1 is a block diagram illustrating an overall configuration of a system.

An overall system configuration including a data collection server 100 will be described with reference to FIG. 1. As illustrated in FIG. 1, in this system, devices 101-1 and 101-2 are connected to a gateway 102-1, and devices 101-3 and 101-4 are connected to a gateway 102-2. The gateways 102-1 and 102-2 are connected to a network 103. The network 103 is connected to the data collection server 100, and a flow compiler 110, brokers 104, data storage units 106, and visualization units 107 are connected to the network 103 respectively.

A plurality of data processing units 105 are connected to a plurality of the brokers 104. The brokers 104 collect and store data output from a plurality of devices 101-1 to 101-4 arranged at the site. The data processing units 105 perform a process of shaping data output from the plurality of devices 101-1 to 101-4 arranged on the site and collected in the brokers 104.

Here, the flow compiler 110, the brokers 104, and the data processing units 105 are configured by the data collection server 100, for example. The data collection server 100 includes a main control unit, a main storage unit, an input unit, an output unit, and a communication unit. Further, the data collection server 100 may be a virtual server on the cloud, and is not limited to a single physical server, and may be constituted by a plurality of physical servers.

Further, the brokers 104 have a buffer function for temporarily storing data output from the plurality of devices 101-1 to 101-4 arranged at the site. Further, the flow compiler 110 has a function of displaying information as well as conversion of a processing flow. For example, the device 101 is a sensor installed in an assembly robot or the like of a production line of a factory in the site, and data (raw data) detected by the sensor is temporarily saved in the brokers 104 connected to the network 103 via a gateway 102.

The data stored in the brokers 104 is input to the data processing unit 105 and subjected to a predetermined shaping process, and then stored in the brokers 104 again. Here, the shaping process is, for example, a process in which additional information is given to data detected by a sensor or the like to convert it into an expression that can be understood by the user or only necessary information is extracted from the data and the remaining information is deleted. The data stored in the brokers 104 is displayed on the visualization units 107 as a graph or the like. As described above, since the data shaping-processed by the data processing unit 105 can be processed while being stored in the brokers 104, a reliability of the data is ensured. In particular, in order to satisfy the requirement that huge and fluctuating data output from the devices 101 arranged in large quantities at a site such as a factory is processed without being lost, it is necessary to process the data shaping-processed by the data processing unit 105 while buffering the data in the brokers 104. In this way, it is possible to ensure a reliability in processing a large amount of data shaping-processed.

A flow of shaping-processing on-site data is displayed on the flow compiler 110. In this case, the user can use the flow compiler 110 to set a flow conversion process according to the execution environment and requirements in a graphical user interface (GUI) environment.

Figure 2A:
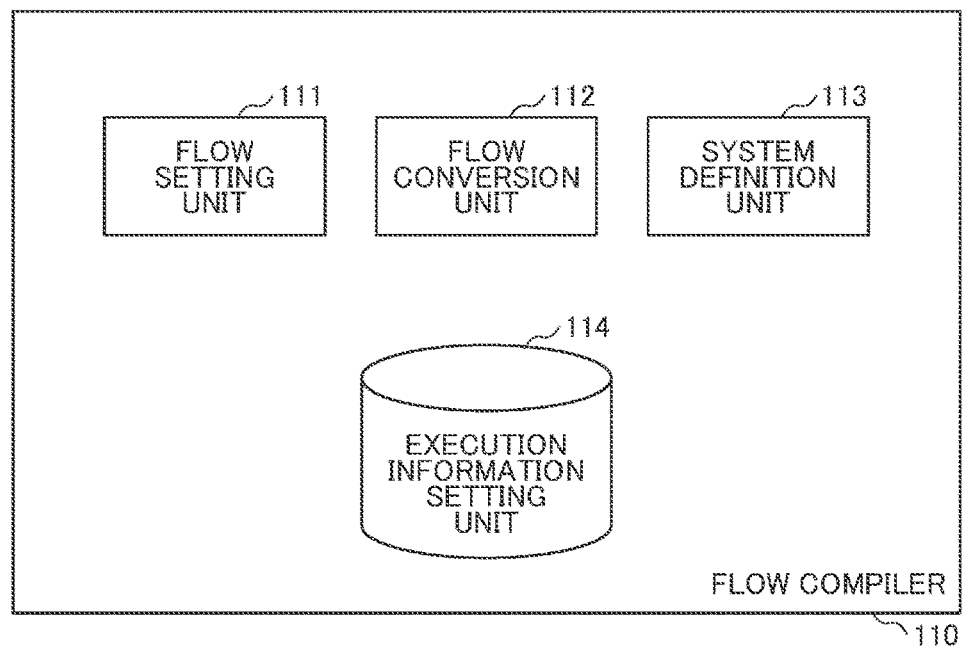
FIGS. 2A and 2B are block diagrams illustrating a configuration of a flow compiler.

Next, a configuration of the flow compiler 110 will be described with reference to FIGS. 2A and 2B. As illustrated in FIG. 2A, the flow compiler 110 includes a flow setting unit 111, a flow conversion unit 112, a system definition unit 113, and an execution information setting unit 114. Functions of the flow setting unit 111, the flow conversion unit 112, and the system definition unit 113 are realized by executing a program in the main control unit of the data collection server 100.

Figure 2B:
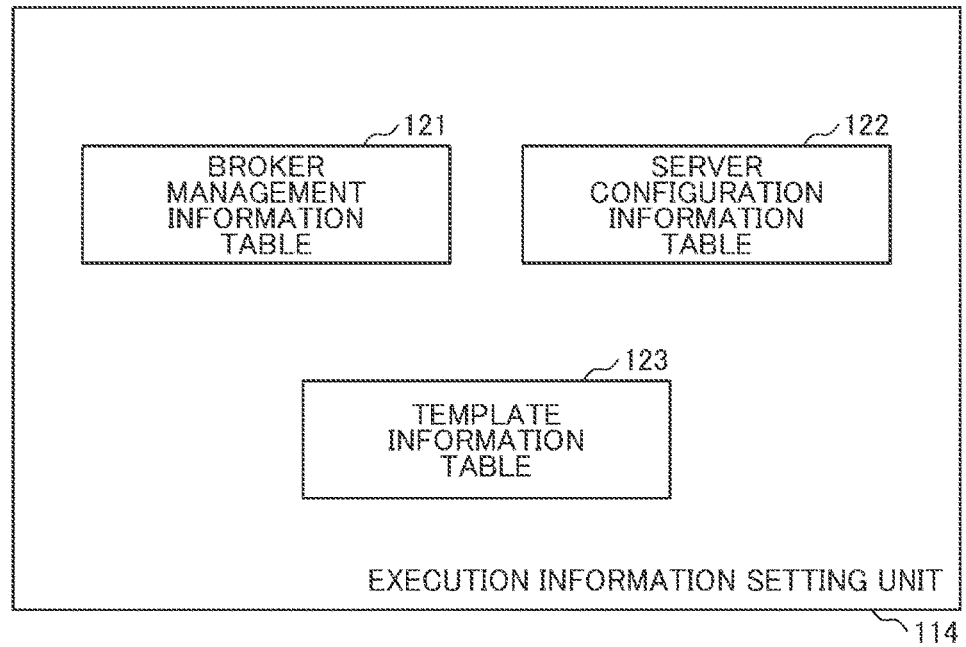

FIG. 2B illustrates details of the execution information setting unit 114. The execution information setting unit 114 includes a broker management information table 121, a server configuration information table 122, and a template information table 123.

The flow setting unit 111 creates a processing flow of site data. The system definition unit 113 directly connects to the main control unit and the like of the server, which is an environment for executing the program, and distributes an execution program. The flow conversion unit 112 converts the processing flow created by the flow setting unit 111 based on the execution information of the execution information setting unit 114.

Further, the flow conversion unit 112 sends the processing flow converted by the flow setting unit 111 to the system definition unit 113. The system definition unit 113 separates the processing flow into an execution program and setting information, and distributes each of them to the execution environment. The execution information setting unit 114 includes a server configuration information table 122 that stores server configuration information of the brokers 104 and the data processing units 105 as information on the execution environment.

Here, the server configuration information table 122 stores server number information as the server configuration information. The template information table 123 stores a shaping process template group to be displayed on display screens of FIGS. 4 and 5. With reference to the template information table 123, for example, shaping 1, shaping 2, shaping 3, etc. are arranged and displayed on the screen as the shaping process. The execution information setting unit 114 includes a broker management information table 121 that stores broker management information for specifying a position in the processing flow into which a broker process is to be inserted.

Based on the broker management information stored in the broker management information table 121, the flow conversion unit 112 inserts the broker process between the shaping processes and converts the flow information. The processing flow converted by the flow conversion unit 112 is displayed on the flow compiler 110. In this way, the flow conversion unit 112 inserts a broker process that holds a state between shaping processes, finally reconfigures each shaping process node to generate a changed processing flow, and send the same to the system definition unit 113. The system definition unit 113 separates the changed processing flow into an execution program and setting information and deploys (distributes) the same to the corresponding execution environment. In this way, rapid development of various data collection and shaping processes is realized.

Next, with reference to FIGS. 3 to 7, a flow conversion process in a system that distributes the site data to each data processing server by round robin or the like will be described.

Figure 3:
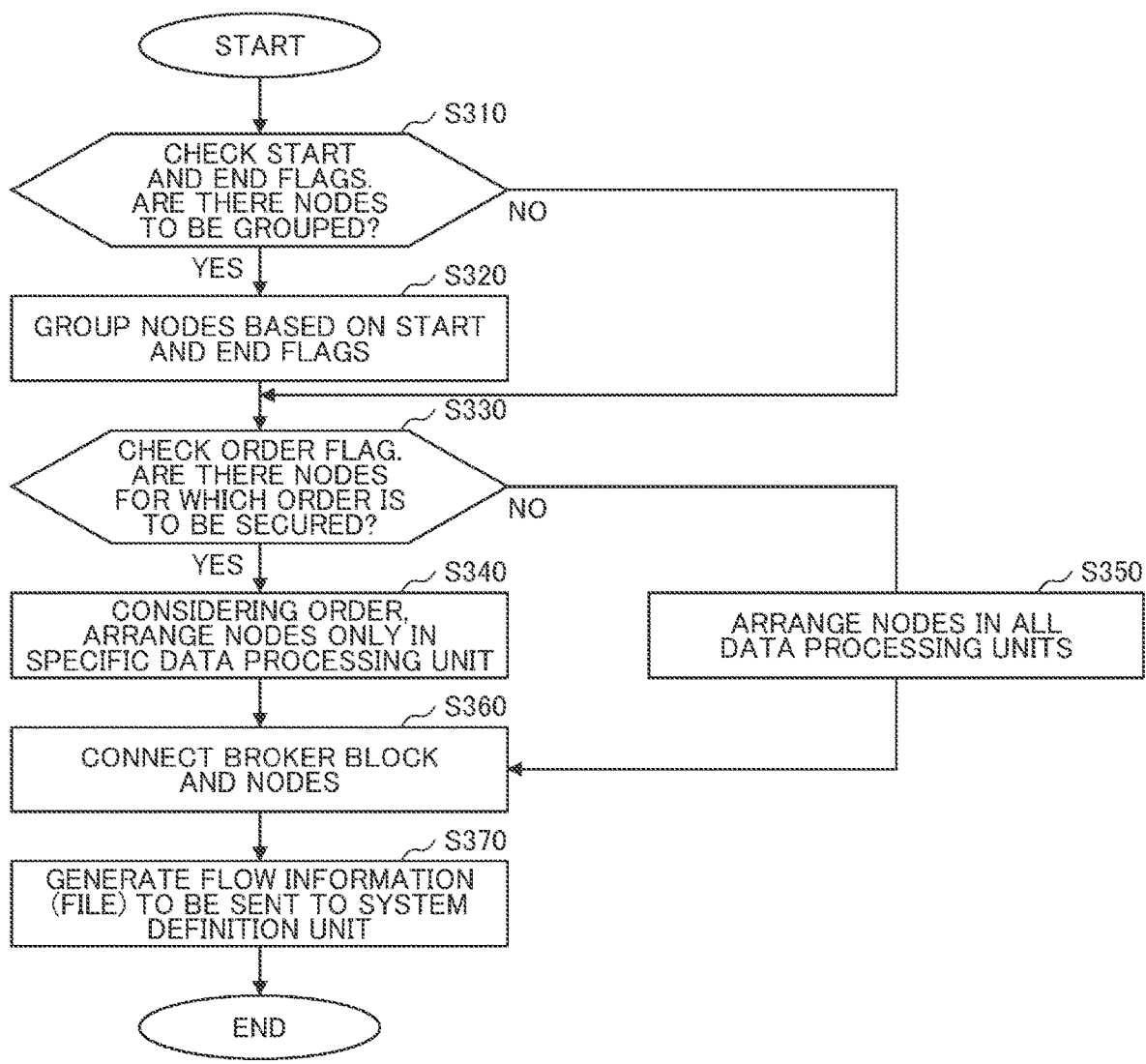
FIG. 3 is a flowchart illustrating a flow conversion process in a cluster system.
Figure 4:
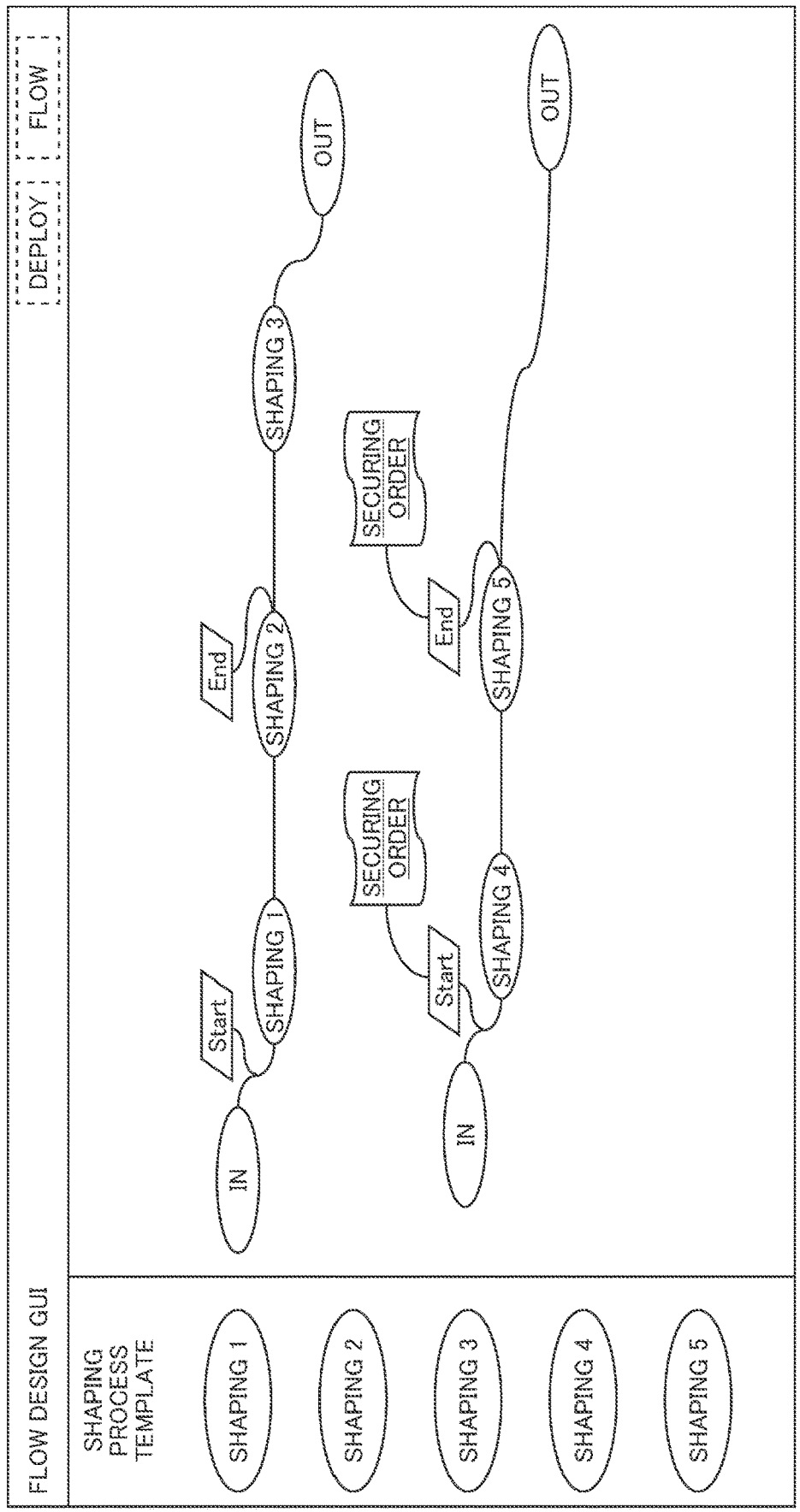
FIG. 4 is a diagram illustrating a processing flow of a data shaping process.

First, based on the flowchart of FIG. 3, it is checked whether there are nodes that need to be grouped by Start and End flags set by the user in the GUI environment as illustrated in FIG. 4 (S310). The nodes are grouped based on the Start and End flags (S320). By grouping the nodes, it is possible to reduce the number of the broker processes, and efficient shaping process can be performed.

Figure 6:
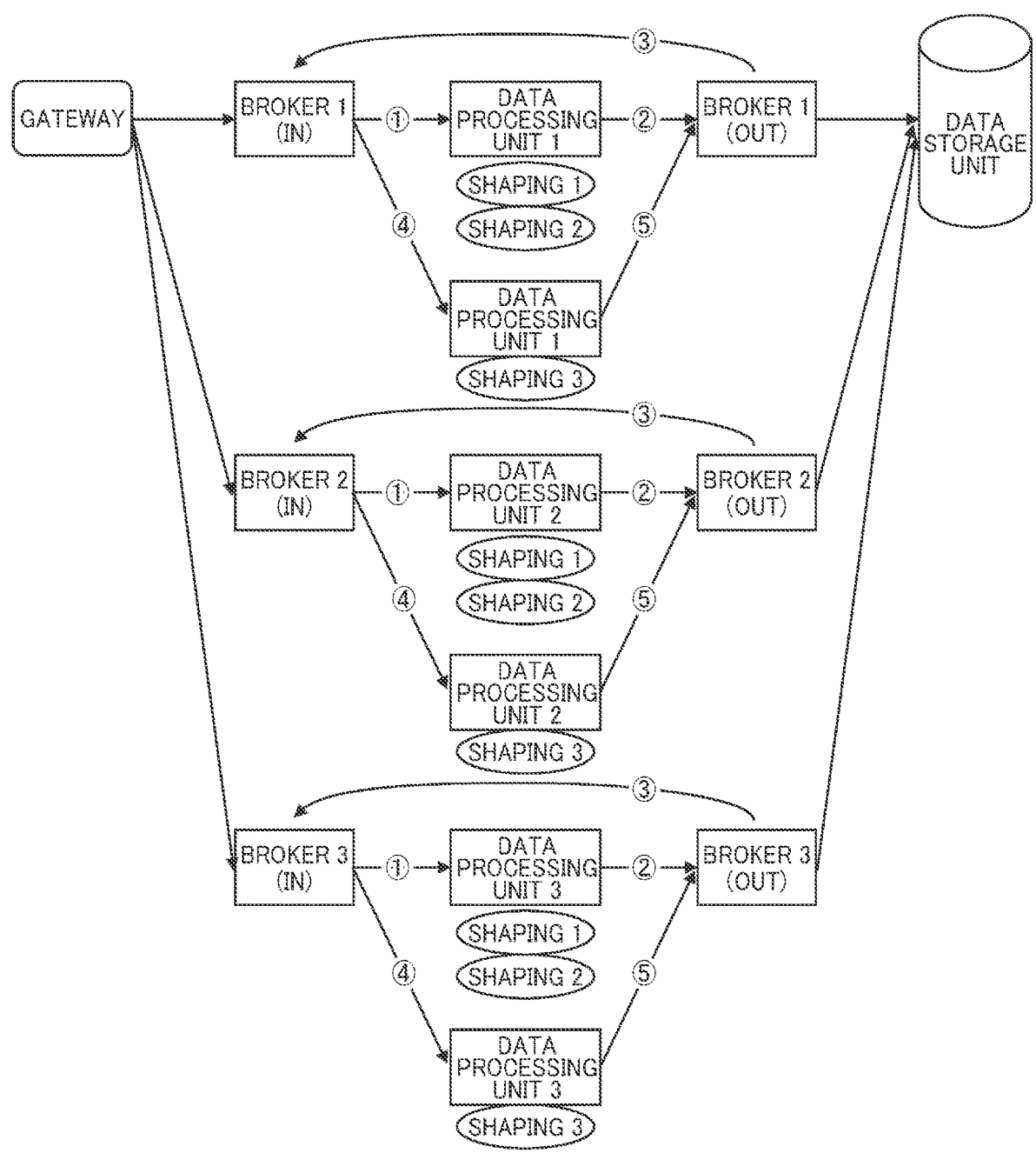
FIG. 6 is a diagram illustrating a data processing flow from a gateway when data order is not considered.

A flow example at the top of FIG. 4 illustrates an example in which an integrated shaping process is performed by grouping the shaping 1 and the shaping 2, and the data shaping process unit independently performs the shaping process on the shaping 3. Here, the integrated shaping process is to collectively perform a plurality of shaping processes grouped based on the Start and End flags, for example. In this case, as illustrated in FIG. 6, data transmitted from the gateway may be sequentially distributed to the plurality of brokers by round robin or the like, and a plurality of data shaping process units may respectively perform a shaping process according to the flow from 1 to 5.

Further, when the plurality of data shaping process units simultaneously perform the shaping process, an order in which the data is stored in the data storage unit after the shaping process may be different from the order when the data is transmitted from the gateway. Therefore, in the next step, an order flag for ensuring the order is checked (S330).

Figure 7:
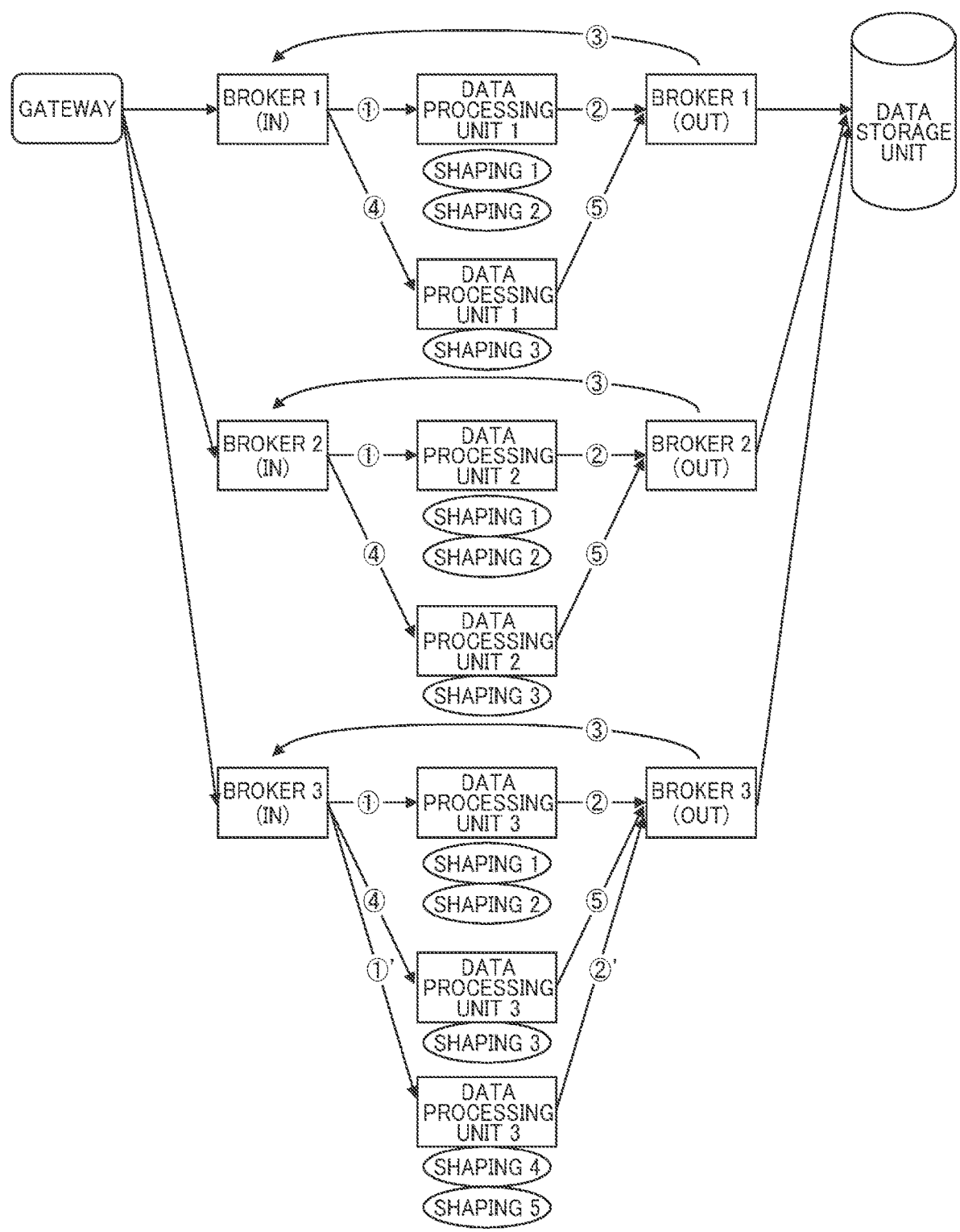
FIG. 7 is a diagram illustrating a data processing flow from the gateway in consideration of the data order.

When the order flag is given, shaping nodes are arranged only in a specific data processing unit in consideration of the order as illustrated in a flow example at the bottom of FIG. 4 (S340). In this case, as illustrated in FIG. 7, after the plurality of data shaping process units respectively perform the shaping process according to the flow from 1 to 5, the shaping process is performed according to a flow from 1' to 2'. At this time, the order of the shaping process can be ensured only by adding the order flag with the GUI without the user being aware of the arrangement of the shaping nodes.

When the order of data is not emphasized, the order flag is not given, so that the nodes are arranged in all the data processing units (S350).

Next, as illustrated in FIG. 5, with reference to the broker management information table 121, a broker block and the nodes are connected (S360). Finally, flow information (file) to be sent to the system definition unit 113 is generated (S370). The file includes, for example, a program for shaping process including shaping 1, shaping 2, shaping 3, etc., for example, shaping process group information (an order of processing) consisting of shaping 1 and shaping 2, and broker setting information.

In this way, in the embodiment, it is possible to provide the user with means for easily and quickly setting an execution unit of the shaping process by using the GUI without considering the execution environment such as the server configuration.

Incidentally, the present invention is not limited to the above-described embodiments, and includes various modifications. Further, for example, the above-described embodiments are described in detail for easy understanding of the present invention, and are not necessarily limited to those provided with all the described configurations. Further, a part of the configuration of each embodiment may be added to, deleted from, or replaced with another configuration.

Further, each of the above-described configurations, functions, processing units, processing means, and the like may be realized by hardware by designing a part or all of them with, for example, an integrated circuit. Further, the present invention can also be realized by software program codes that implement the functions of the embodiments. In this case, a storage medium in which the program code is recorded is provided to a computer, and a processor included in the computer reads the program code stored in the storage medium. In this case, the program code itself read from the storage medium realizes the functions of the above-described embodiments, and the program code itself and the storage medium storing the same constitute the present invention. Examples of storage media for supplying such program codes include a flexible disk, a CD-ROM, a DVD-ROM, a hard disk, a solid state drives (SSDs), an optical disk, a magneto-optical disk, a CD-R, a magnetic tape, a non-volatile memory card, a ROM, or the like.

Further, the program code for realizing the functions described in the present embodiment can be implemented by a wide range of programs or script languages, for example, assembler, C/C++, perl, Shell, PHP, Python, Java (registered trademark), and the like.

Further, the program code of the software that realizes the functions of the embodiments may be distributed via a network, whereby the program code may be stored in a storage means such as a hard disk or a memory of a computer or a storage medium such as a CD-RW or a CD-R, and the processor included in the computer may read and execute the program code stored in the storage means or the storage medium.

In the above-described embodiments, the control lines and information lines indicate what is considered necessary for the explanation, but not all the control lines and information lines are necessarily illustrated on the product. All the components may be connected to each other.

What is claimed is:

1. A data collection server that collects and converts data, the data collection server comprising:
a data processing unit that executes a plurality of shaping processes to shape the collected data;
a flow setting unit that sets a data processing flow based on the shaping processes in the data processing unit;
an execution information setting unit that sets information of an execution environment of the shaping processes; and
a flow conversion unit that converts the processing flow created by the flow setting unit based on the information of the execution environment set by the execution information setting unit,
wherein the flow setting unit accepts setting inputs of first and second flags before and after the plurality of shaping processes,
wherein the data processing unit performs an integrated shaping process for collectively executing the plurality of shaping processes between first and second flags when there are the first and second flags before and after the plurality of shaping processes, and
wherein the execution information setting unit updates the information of the execution environment based on execution contents of the integrated shaping process.

2. The data collection server according to claim 1, wherein the first flag indicates a start point of the integrated shaping process, and the second flag indicates an end point of the integrated shaping process.

3. The data collection server according to claim 2, wherein the flow setting unit accepts a setting input of an order security flag for ensuring an order of the shaping processes in the execution environment set by the execution information setting unit, and
wherein the data processing unit preferentially executes a predetermined integrated shaping process when the order security flag is present before and after the plurality of shaping processes.

4. A data collection method for collecting and converting data, the data collection method comprising:
executing a plurality of shaping processes to shape the collected data;
setting a data processing flow based on the shaping processes;
setting information of an execution environment of the shaping processes;
converting the processing flow based on the set information of the execution environment;
accepting setting inputs of first and second flags before and after the plurality of shaping processes;
performing an integrated shaping process for collectively executing the plurality of shaping processes between the first and second flags when there are the first and second flags before and after the plurality of shaping processes; and
updating information of the execution environment based on execution contents of the integrated shaping process.

5. The data collection method according to claim 4, wherein the first flag indicates a start point of the integrated shaping process, and the second flag indicates an end point of the integrated shaping process.

6. The data collection method according to claim 5, comprising:
accepting a setting input of an order security flag for ensuring an order of the shaping processes; and
preferentially executes a predetermined integrated shaping process when the order security flag is present before and after the plurality of shaping processes.

* * * * *